UNITED STATES PATENT OFFICE.

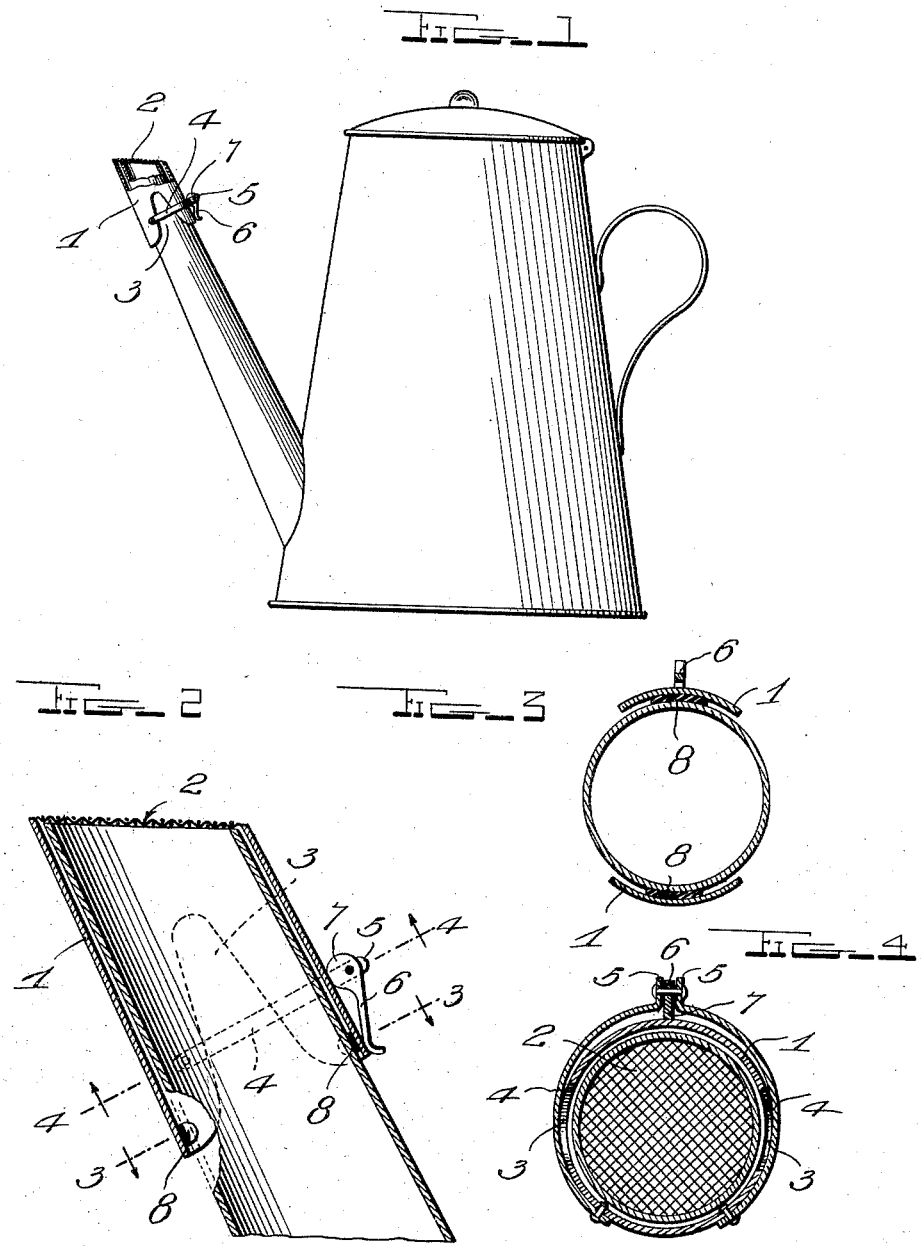

JOSEPH H. PITSCHMAN, OF FRESNO, CALIFORNIA.

STRAINER.

1,078,459. Specification of Letters Patent. Patented Nov. 11, 1913.

Application filed January 23, 1913. Serial No. 743,828.

*To all whom it may concern:*

Be it known that I, JOSEPH H. PITSCHMAN, a citizen of the United States, residing at Fresno, in the county of Fresno and State of California, have invented certain new and useful Improvements in Strainers; and I do declare the following to be a full, clear, and exact description of the invention, such as will enable others skilled in the art to which it appertains to make and use the same.

This invention relates to improvements in strainers and particularly to strainers which are to be applied to the spouts of tea and coffee pots.

One object of the invention is to provide a strainer of this character adapted to fit over the end of the spout of a tea or coffee pot and having improved means for detachably fastening the strainer to the spout.

Another object is to provide a strainer of the character described which will be simple, strong and durable in construction, efficient and reliable in operation, and which will be inconspicuous and not unsightly when applied to the spout of a tea or coffee pot.

With these and other objects in view, the invention consists of certain novel features of construction, and the combination and arrangements of parts as will be more fully described and claimed.

In the accompanying drawings; Figure 1 is a side view of a coffee pot showing my improved strainer applied to the spout thereof; Fig. 2 is an enlarged vertical sectional view of the outer end of the spout showing the strainer in position thereon; Fig. 3 is a cross sectional view of the spout and inner end of the strainer taken on the line 3—3 of Fig. 2; Fig. 4 is a similar view taken on the line 4—4 of Fig. 2.

My improved strainer comprises a tubular cylindrical body portion 1 adapted to be engaged with the outer end of the spout of a tea or coffee pot and as clearly shown in Figs. 1 and 2 of the drawings. The outer end of the tubular body of the strainer is covered by a screen 2 which may be formed by perforating the outer end of the body of the strainer or in any other suitable manner, and which is here shown as a fine mesh wire screen, which when the strainer is applied to the spout of the pot, covers the end of the spout so that the liquid poured from the pot must pass through the screen and is thereby strained or filtered.

In order to securely fasten the strainer body in operative engagement with the end of the spout, said body is provided on its opposite sides and at its inner end with longitudinally disposed V-shaped notches or recesses 3 which impart a certain amount of resiliency to the inner portion of the body of the strainer. Engaged with the inner end of the body of the strainer is a clamping yoke 4 comprising curved or segmental strips the inner ends of which are pivotally secured to the opposite sides of the body 1 of the strainer adjacent to the lower edges of the recesses 3.

The strips forming the yoke 4 extend upwardly or around and over the upper side of the body of the strainer and have their upper ends bent outwardly to form bearing lugs 5 between which is pivotally secured a clamping lever 6 having on its inner end an eccentric head 7 which is adapted to bear against the outer side of the upper portion of the strainer body whereby when the lever is swung downwardly the engagement of said eccentric head of the lever with the adjacent side of the strainer will draw the notched resilient ends of the latter into tight engagement with the end of the spout. Secured at diametrically opposite points in the inner side of the inner end of the body 1 are pads 8 of rubber or other suitable material which when the sides of the strainer are drawn into engagement with the spout, firmly grip and form a frictional engagement therewith which will materially aid in preventing the strainer from slipping off from the end of the spout.

My improved strainer may be constructed of metal, hard rubber or any other suitable material and when applied to the spout of a tea or coffee pot will be inconspicuous and will not present an unsightly appearance.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A device of the character set forth comprising a member adapted to have a telescopic engagement with the spout of a receptacle and having in its inner end oppositely disposed V-shaped notches forming resilient lips, a strainer at the outer end of the member, a yoke encircling one of said lips and having its ends attached to the opposite lip, and a cam lever on said yoke, whereby said lips may be compressed and brought into locked engagement with said spout.

2. A strainer comprising a tubular body having a notched inner end, a screen on the outer end thereof, a clamping yoke pivoted to the inner portion of said body below the notches therein, a clamping lever pivoted between the outer ends of the yoke and having an eccentric head adapted to be turned downwardly into engagement with the adjacent side of the strainer whereby the notched end thereof is drawn into tight frictional engagement with the spout of a container.

3. A strainer comprising a tubular body having a notched inner end, a screen on the outer end thereof, friction pads secured to the inner surface of the inner notched ends of the strainer body, a clamping yoke pivotally secured at its inner end to the opposite sides of the strainer adjacent to the lower edges of the notches therein, a clamping lever pivoted in the outer portion of said yoke, an eccentric head on said lever adapted to be engaged thereby with the adjacent side of the body of the strainer whereby the notched end of said body is drawn into tight frictional engagement with the spout of a container.

In testimony whereof I have hereunto set my hand in presence of two subscribing witnesses.

JOSEPH H. PITSCHMAN.

Witnesses:
JOSEPH STAGEL,
WILLARD G. CRAM.

---

Copies of this patent may be obtained for five cents each, by addressing the "Commissioner of Patents, Washington, D. C."